US 7,010,151 B2

(12) United States Patent
Wei et al.

(10) Patent No.: US 7,010,151 B2
(45) Date of Patent: Mar. 7, 2006

(54) ENDPLATE DETECTION IN DIGITAL RADIOGRAPHY BY DYNAMIC PROGRAMMING USING BOTH LOCAL AND GLOBAL CONSTRAINTS

(75) Inventors: Guo-Qing Wei, Plainsboro, NJ (US); Jianzhong Qian, Princeton, NJ (US); Helmuth Schramm, Neunkirchen (DE)

(73) Assignee: Siemens Corporate Research, Inc., Princeton, NJ (US)

( * ) Notice: Subject to any disclaimer, the term of this patent is extended or adjusted under 35 U.S.C. 154(b) by 165 days.

(21) Appl. No.: 10/016,096

(22) Filed: Dec. 10, 2001

(65) Prior Publication Data

US 2005/0196029 A1    Sep. 8, 2005

Related U.S. Application Data

(60) Provisional application No. 60/326,358, filed on Oct. 1, 2001.

(51) Int. Cl.
*G06K 9/00*     (2006.01)
(52) U.S. Cl. .................... 382/132; 382/199; 382/203; 128/922
(58) Field of Classification Search ............... 382/128, 382/132, 173, 190, 192, 194, 196, 199, 203, 382/209; 128/922
See application file for complete search history.

(56) References Cited

U.S. PATENT DOCUMENTS 5,946,370 A * 8/1999 Adler et al. ................. 378/4
6,608,917 B1 * 8/2003 Wei et al. .................. 382/132
6,668,083 B1 * 12/2003 Verdonck et al. ........... 382/203

* cited by examiner

*Primary Examiner*—Brian Werner
*Assistant Examiner*—Christopher Lavin
(74) *Attorney, Agent, or Firm*—Donald B. Paschburg; F. Chau & Associates, LLC

(57) ABSTRACT

Disclosed is a method and apparatus for detecting endplates of vertebra, comprising the steps of providing a filtered curvature map derived from filtering an intensity curvature map of a spine image in a direction relative to a spine axis, computing minimum and maximum curvature projections for each point along said spine axis, at a plurality of points on said spine axis, computing a score from said curvature projections, said score indicating the likelihood that the point is located on an endplate, and subjecting said score calculation to at least one of the following constraints (1) that the angle between neighboring endplates not exceed a certain value, and (2) that the variation in height of vertebra of said spine image should satisfy a global model.

8 Claims, 5 Drawing Sheets

(a) (b)

(a) (b)

(a)

(b)

(a) (b)

ENDPLATE DETECTION IN DIGITAL RADIOGRAPHY BY DYNAMIC PROGRAMMING USING BOTH LOCAL AND GLOBAL CONSTRAINTS

CROSS REFERENCE TO RELATED APPLICATION

The present application claims priority to U.S. Provisional Patent Application Ser. No. 60/326,358, filed Oct. 1, 2001, which is hereby incorporated by reference.

BACKGROUND OF THE INVENTION

1. Field of the Invention

The present invention relates generally to analysis of X-ray images, and more particularly, to the automatic detection of vertebra endplates for measuring deformities of pathological spines in digital radiography.

2. Description of Related Art

In a previously disclosed invention, "Detection of vertebra endplates in digital radiography", U.S. application Ser. No. 09/638,123 an evidence reasoning approach is proposed. First, local pieces of evidence of different kinds are collected. They are then combined by a rule-based deduction to incorporate certain geometric constraints about endplate shape to determine the positions of endplates. Because the reasoning about endplate positions in the previously disclosed technique is mainly local, it is difficult to apply some global shape constraints. Global constraints are especially useful when there are other organs interfering with the endplate, causing part of the endplate image to be blurred, obscured, or underexposed. Errors in local reasoning also tend to propagate: if a mistake is made at one place, it will affect the decision making at other places.

In this invention, a global reasoning approach is adopted. Decision-making about endplate positions at local regions is deferred until information is gathered about all endplates in the image. This is achieved via a dynamic programming approach. Dynamic programming is a general method for optimization. The invention formulates the endplate detection problem in a form suitable to solve by dynamic programming. Besides, the conventional dynamic programming approach is generalized to allow global constraints to be enforced in a progressive manner. This is realized by introducing backward tracing during forward computation of endplate scores. As a global constraint on vertebra shape, an analytic model about vertebra height distribution is proposed.

SUMMARY OF THE INVENTION

Disclosed is a method and apparatus for detecting endplates of vertebra, comprising the steps of providing a filtered curvature map derived from filtering an intensity curvature map of a spine image in a direction relative to a spine axis, computing minimum and maximum curvature projections for each point along said spine axis, at a plurality of points on said spine axis, computing a score from said curvature projections, said score indicating the likelihood that the point is located on an endplate, and subjecting said score calculation to at least one of the following constraints (1) that the angle between neighboring endplates not exceed a certain value, and (2) that the variation in height of vertebra of said spine image should satisfy a global model.

In another aspect of the method said step of computing minimum and maximum curvature projections further comprises the steps of computing said spine axis from a spine image boundary, at each point p along said spinal axis, compute a curve set $S_p$ of all fitting curves passing through point p from one boundary to the other that fit the parabolic equation $y=kx^2+b$, deriving said maximum curvature projection as the maximum of the curvature sums along said fitting curves, and deriving said minimum curvature as the minimum of the curvature sums along said fitting curves.

In another aspect of the method said score E is computed from the equation $$E = \sum_{i=1}^{N} C_{s,\max}(e_i) + \sum_{V=1}^{V} \max_{p \in (e_{2v}, e_{2(v+1)})} \{C_{s,\min}(p)\}$$

where V is the number of vertebrae, the first term is the sum of the values of said maximum curvature projections at endplate positions, and the second term is the sum of the values of said minimum curvature projections at intervertebral disc positions.

In another aspect of the method said score is computed by dynamic programming.

In another aspect of the method said dynamic programming comprises the steps of obtaining the range of first and last endplates, using the range of said first endplate and said constraints to determine the range of the next endplate if still within range of said last endplate, backward tracing through the state space in the dynamic programming optimization of the score to derive a vertebra height profile, fitting a global endplate height model to an augmented height profile up to a threshold value of the fitting residual, repeating said step of using said constraints to determine the range of endplates on subsequent endplates until the range of the last endplate is reached.

DETAILED DESCRIPTION OF PREFERRED EMBODIMENTS

Figure 1:
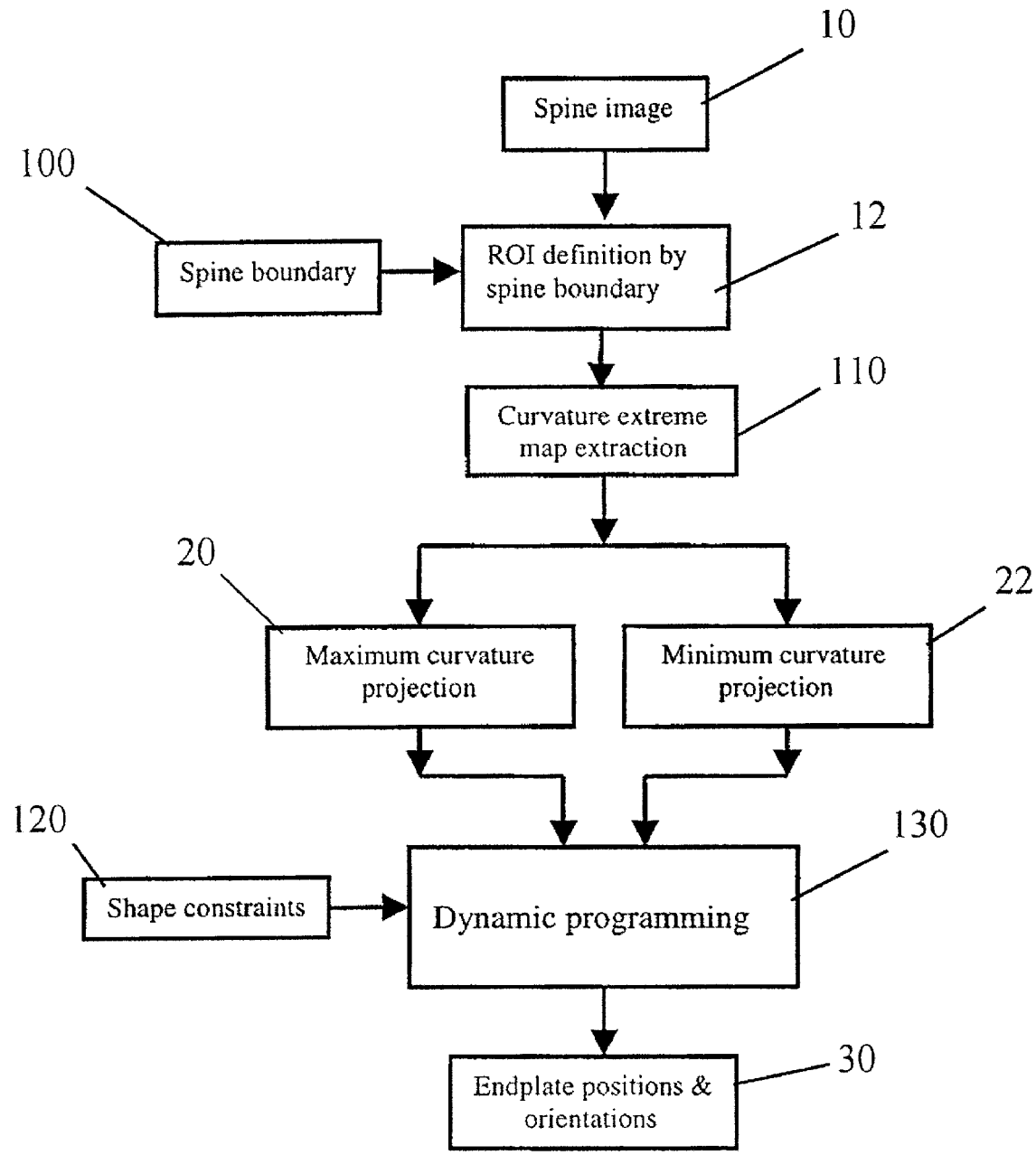
FIG. 1 is a flowchart diagram of an embodiment of the invention.

It is assumed in this invention that the spine boundary has been detected by a previously disclosed technique ("Automatic detection of spine axis and spin boundary in digital radiography", U.S. application Ser. No. 09/638,120 the disclosures of which are incorporated by reference herein in their entirety. Based on the spine boundary information, the curvature extreme map is extracted and filtered, in the same way as was disclosed in U.S. application Ser. No. 09/638, 123 the disclosures of which are incorporated by reference herein in their entirety, but with one important improvement: projections are based on a curved endplate model. The curvature map projection produces two curves: the maximum curvature projection and the minimum curvature projection. These two projections are combined to derive the endplate positions by a dynamic programming approach that can consider both local and global constraints on vertebra shape. FIG. 1 shows the workflow of the detection.

Figure 2:
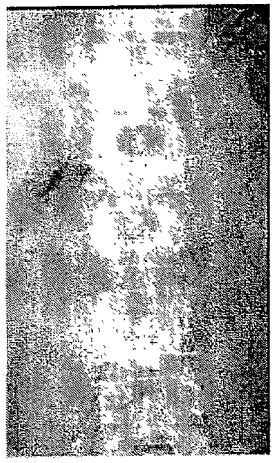
FIG. 2(a) is a typical spinal image.
FIG. 2(b) is the same image as 2(a) with superimposed anatomical markings
Figure 2:
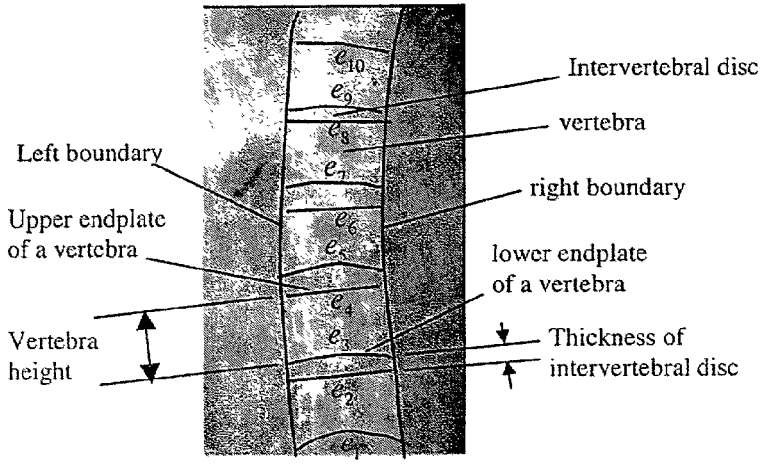

Referring to FIG. 1, control blocks that are identical to those disclosed in U.S. application Ser. No. 09/638,123 are labeled with double-digit numerals, while those control blocks new to this invention are labeled with triple-digit numerals. It should be noted, however, that while blocks 20 and 22 are identical to that disclosed in U.S. application Ser. No. 09/638,123 the method by which these two blocks are executed is novel to this invention. At block 10, a spine image is provided, in which endplate orientations are desired. This image of a spine may have been taken by X-ray or other imaging technologies, such as computerized axial tomography (e.g., CAT scan), sonogram, magnetic resonance (MRI) or other techniques. The image is preferably converted to or taken in digital form. FIG. 2 is an example of a spine image, which may be provided as input to the endplate detection system of the present invention.

In block 12, a region-of-interest (ROI) is defined, for example, based on boundaries of the spine, which are input from block 100. The detection is preferably confined to the spine boundary and may be performed by analyzing the image of the spine.

Figure 3:
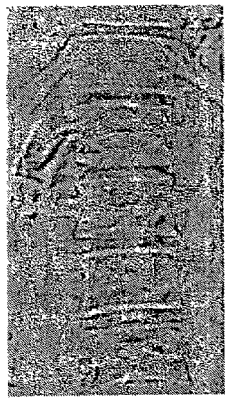
FIG. 3(a) is a filtered curvature map of FIG. 2(a)
FIG. 3(b) shows a curvature projection.
Figure 3:
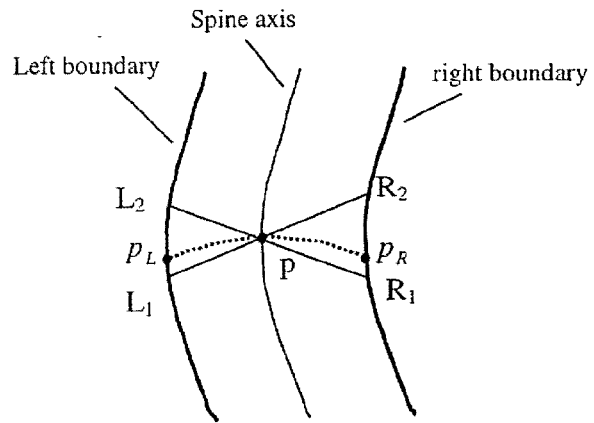

In block 110 a curvature map of the spine is extracted, such as by the method disclosed in U.S. application Ser. No. 09/638,120. The map is shown in FIG. 3($a$).

In blocks 20 and 22 maximum and minimum curvature projections are derived as more fully explained below.

In block 130, the dynamic programming disclosed in this invention is executed as will be more fully described below.

In block 30, the best scores provide the endplate positions and orientations.

For notational convenience, FIG. 2$a$ shows a typical spine image. FIG. 2$b$ shows the same image labeled with the anatomical landmarks relevant to this invention.

In the following, two major components of this invention are disclosed in details. They are a) the improved curvature projection, and b) the dynamic programming approach for deriving endplate positions.

Curved Curvature Map Projection

Curvature map projection is performed for the purpose of computing of the local score of support for endplates and intervertebral discs. Curvature map projection operates on a filtered curvature map. FIG. 3($a$) shows the filtered curvature map of FIG. 2($a$), obtained by the method disclosed in U.S. application Ser. No. 09/638,123 or other suitable method.

FIG. 3($b$) illustrates how a curvature map is projected to obtain curved curvature-map projections.

First, the spine axis is computed from the spine boundary. For each point p on the spine axis, draw two lines at a fixed angle to the orthogonal line of the tangential line of the spine axis at p. These two lines intersect with the left and right spine boundaries at $L_1$, $L_2$ and $R_1$ $R_2$ respectively. The segment $L_1$, $L_2$ determines the range of the left end-points of endplates on the left spine boundary, while $R_1$ $R_2$ determines the range of the right end-points of endplates on the right spine boundary. For each point $p_L$ on the curved segment $L_1$ $L_2$, $p_R$ on segment $R_1$ $R_2$, fit a parabolic curve:

$$y = kx^2 + b$$

to the three points, $p_L$, p, and $p_R$. Denote this curve by $C(p_L, p, p_R)$. If there are $n_L$ points on $L_1$ $L_2$ and $n_R$ points on $R_1$ $R_2$, the total number of fitting curves at p is $n_L \cdot n_R$ Denote this curve set by $S_p = \{C(p_L, p, p_R)\}$.

Referring to FIG. 1, box 20, for the maximum curvature projection, the curve set $S_p$ represents all possible endplates passing through point p. The maximum curvature projection at p is obtained as the maximum of the curvature sums along such fitting curves. If there were an endplate passing through p, this endplate will be captured by the curve producing the maximum curvature projection, because endplates appear as ridges in the curvature map. The orientation of the endplate can be directly derived from the fitted curve.

Referring to box 22, for the minimum curvature projection, the curve set $S_p$ represents all possible intervertebral discs passing through point p. The minimum curvature projection at p is obtained as the minimum of the curvature sums along all these fitting curves. If there were an intervertebral disc at p, its position will be captured by the curve producing the minimum curvature projection, because an intervertebral disc usually appear as a valley in the curvature map.

The curvature projections are computed for each point on the spine axis. So, two curves are produced, one for the maximum curvature projection, denoted by $C_{max}(p)$, and one of the minimum curvature projection, denoted by $C_{min}(p)$.

Figure 4:
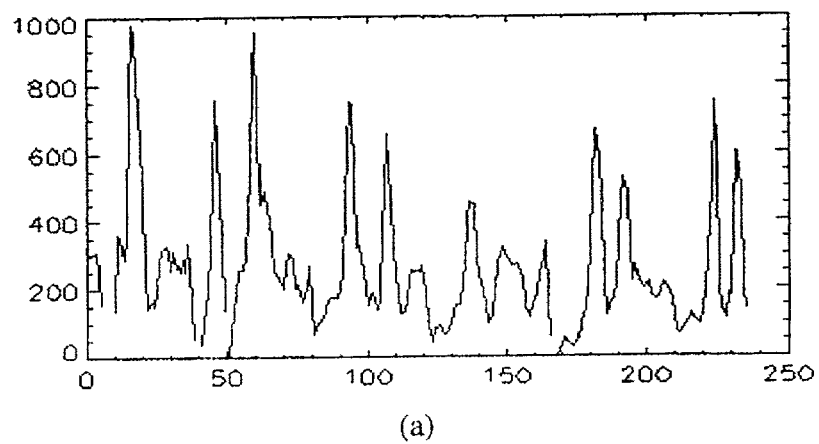
FIG. 4 are graphs of maximum and minimum curve projections.
Figure 4:
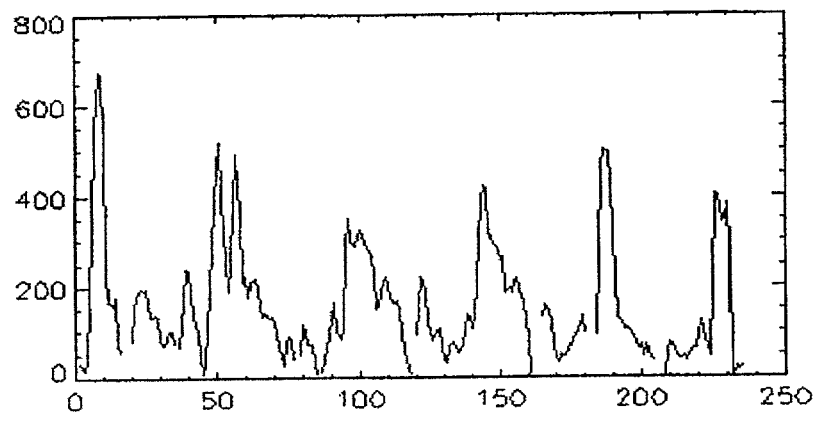

FIGS. 4($a$) and ($b$) show, respectively, the maximum curvature projection and the inverse of the minimum curvature projection of FIG. 3($a$) in graphs plotting pixels versus the curvature value. The inversion for the minimum curvature projection is intended for just converting valleys to peaks. Therefore, peaks on the maximum curvature projection indicate possible positions of endplates on the spine axis, whereas peaks on the curve of minimum curvature projection mark possible positions of intervertebral disc on the spine axis.

Dynamic Programming to Determine Endplate Positions:

According to the characteristics of the curvature projection profiles, an endplate should correspond to a peak on the maximum curvature projection, and between two endplates—one corresponding to the upper endplate of a vertebra, and one corresponding to the lower endplate of the immediately above vertebra—there should be a peak in the minimum curvature projection curve, corresponding to the intervertebral disc. Therefore, endplate positions are sought which should satisfy these conditions, but at the same time meet all constraints about vertebra shape. The constraints about vertebra shape used in this invention are:

a) The heights of vertebrae are within a given range;
b) The height ratio of neighboring vertebrae is within a certain range;
c) The ratio of the thickness of the inter-vertebral disc to the vertebra height is within a certain range;
d) The angle between neighboring endplates should not exceed a certain value.
e) The vertebra height variation should satisfy a global model.

Items a), b) and c) have been already disclosed in U.S. application Ser. No. 09/638,123, while items d) and e) are new to this invention. These constraints correspond to box 120 of FIG. 1.

Referring again to FIG. 2, ranges of vertebra heights can be computed as being proportional to the vertebra widths, which can in turn be measured from the distance between the left and right spine boundaries. Suppose the vertebra positions on the spine axis are denoted by $e_1$ $e_2$, ..., $e_N$, where N is the number of endplates. Suppose the order of the endplate positions are from the lower part to the upper part of the spine body, and $e_1$ is the lower endplate of the starting vertebra in the detection, and $e_N$ is the upper endplate of the ending vertebra. Then the height of each vertebra is $h_1=e_2-e_1$, $h_2=e_4-e_3$, ..., $h_V=e_N-e_{N-1}$, with the number of vertebrae being $V=N/2$. The thickness of the intervertebral disc is then $t_1=e_3-e_2$, $t_2=e_4-e_3$, ..., $t_{V-1}=e_{N-1}-e_{N-2}$. Suppose the orientation of endplate $e_V$ is denoted by $\theta(e_v)$. Then the conditions a) through e) can be expressed, respectively, as $$h_{min} < h_v < h_{max} \tag{1}$$

$$r_{hh,min} < h_v/h_{v-1} < r_{hh,max} \tag{2}$$

$$r_{th,min} < t_v/h_v < r_{th,max} \tag{3}$$

$$|\theta(e_v) - \theta(e_{v-1})| < \theta_{max} \tag{4}$$

$$g(h_v) = 0 \tag{5}$$

where $h_{min}$, $h_{max}$, $r_{hh,min}$, $r_{hh,max}$, $r_{th,min}$, $r_{th,max}$, and $\theta_{max}$ are predefined values. Because there exits no standard form for g() in physiology for describing the relationships among vertebra heights, we found the following generic form of g() gives a good approximation of this relationship $$h_v = ka^v + b \tag{6}$$

where the parameters k,a,b are unknown constants for a specific spine, but varies across different spines. Because of the order of endplates as being from bottom to top, the parameter a will always be less than or equal to 1, meaning that running from the lower to the top part of a spine, the vertebra height should never be increasing. If a=1, Equation (6) models vertebrae of constant heights.

Based on the above analysis, the task of endplate detection can be formulated as: to find $e_1$ $e_2$, ... $e_N$ such that a score measuring the degree of support for these positions to be on endplates be maximized while satisfying the constraints of Equations (1) through (5). We choose the score as:

$$E = \sum_{i=1}^{N} C_{s,max}(e_i) + \sum_{V=1}^{V} \max_{p \in (e_{2v}, e_{2(v+1)})} \{C_{s,min}(p)\} \tag{7}$$

where V has the same meaning as before, i.e., the number of vertebrae. The first term in Equation (7) is the sum of the values of the maximum curvature projections at the endplate positions, while the second term is the sum of the values of the minimum curvature projections at the intervertebral disc positions. Because the exact positions of the intervertebral disc are not important to the endplate detection, the second term of Equation (7) is formulated to say that the intervertebral disc should be constrained to lie between an upper endplate and the lower endplate of the immediately above vertebra and to have a peak in the minimum curvature projection.

The maximization of Equation (7) subject to the constraints Equations (1)~(5) is a nontrivial task. First, because the problem is highly nonlinear, there is no closed-form solution for it. Secondly because the dimension of the problem is N+1, an exhaustive search is impractical. Note that the number of endplates N is also an unknown (that's why the dimension of the problem is N+1 instead of N). Finally the global constraint of Equation (6) with unknown model parameters complicated the problem further.

We utilize a generalized dynamic programming approach for the optimization. In the standard dynamic programming approach, constraints like Equation (6) cannot be enforced. Because the model parameters of Equation (6) are unknown, they have to be estimated from the heights of all vertebrae. This means that all endplate positions are involved in Equation (6), making the constraint an N-dimensional one. In this invention, an approach is proposed to introduce backward tracing during forward propagation, so that global constraints like Equation (5) can be enforced in a progressive manner.

First Equation (7) needs to be converted into a form suitable to solve by dynamic programming:

$$E = C_{s,max}(e_1) + \tag{8}$$

$$C_{s,max}(e_2) + C_{s,max}(e_3) + \max_{p \in (e_2, e_3)} \{C_{s,min}(p)\} +$$

$$C_{s,max}(e_4) + C_{s,max}(e_5) + \max_{p \in (e_4, e_5)} \{C_{s,min}(p)\} + \ldots +$$

$$C_{s,max}(e_{N-2}) + C_{s,max}(e_{N-1}) + \max_{p \in (e_{N-2}, e_{N-1})} \{C_{s,min}(p)\} +$$

$$C_{s,max}(e_N)$$

$$= C_{s,max}(e_1) + \sum_{v=1}^{V}$$

$$\left[ C_{s,max}(e_{2v}) + C_{s,max}(e_{2v+1}) + \max_{p \in (e_{2v}, e_{2v+1})} \{C_{s,min}(p)\} \right] +$$

$$C_{s,max}(e_N)$$

where the score terms are grouped in V+2 groups. The maximization of Equation (8) can be viewed as choosing appropriate variables from V+2 layers, $e_1$ from the first layer, $(e_{2v}, e_{2v+1})$ from the following V layers, v=1, ... V, and $e_N$ from the last layer, such that the total score is maximized. We labeled the layers by $L_v$, v=0, 1, ... V+1 in the sequel.

Instead of directly using endplate positions as the state variables in each layer (except for layers $L_0$ and $L_{V+1}$), we employ an equivalent representation $(e_{2v}, t_v)$, where $t_v$ is the thickness of the intervertebral disc between vertebrae v and v+1. The advantages of using $(e_{2v}, t_v)$ to parameterize the state space is that the range of $t_v$ is much smaller than that of $e_{2v+1}$, reducing significantly the memory requirement in the maximization procedure. According to Equation (3), the range of $t_v$ is only a fraction of the vertebra height. From $(e_{2v}, t_v)$, it is easy to get the other endplate position as $$e_{2v+1} = e_{2v} + t_v \tag{9}$$

With the new parameterization, the local score for layer $L_v$ in Equation (8) can be written as:

$$E_0(e_1) = C_{s,max}(e_1) \tag{10}$$

$$E_v(e_{2v}, t_v) = C_{s,max}(e_{2v}) + C_{s,max}(e_{2v} + t_v) + \max_{p \in (e_{2v}, e_{2v} + t_v)} \{C_{s,min}(p)\}; \tag{11}$$

$$v = 1, \ldots V$$

$$E_{V+1}(e_V) = C_{s,max}(e_V) \tag{12}$$

Because at most two variables appear in each local score, the dimension of the dynamic programming is two if there were no constraint like Equation (6) involved. As was mentioned before, the constraint of Equation (6) involves all N endplate positions, making the dimension of dynamic programming the same as that of an exhaustive search.

The score maximization of Equation (8) by dynamic programming without the constraints of Equations (1)~(5) can be expressed as follows:

$$S_1(e_2, t_1) = \max_{e_1}[E_0(e_1) + E_1(e_2, t_1)] \quad (13)$$

$$S_v(e_{2v}, t_v) = \max_{e_{2,t_v}}[S_{v-1}(e_{2(v-1)}, t_{v-1}) + E_v(e_{2v}, t_v)]; \quad (14)$$

$$v = 1, \ldots, V$$

$$S_V(e_N) = \max_{e_{2V}, t_V}[S_V(e_{2V}, t_V) + E_V(e_N)] \quad (15)$$

$$\max_{e_1, e_2, \ldots, e_N} E = \max_{e_N} S_V(e_N) \quad (16)$$

Figure 5:
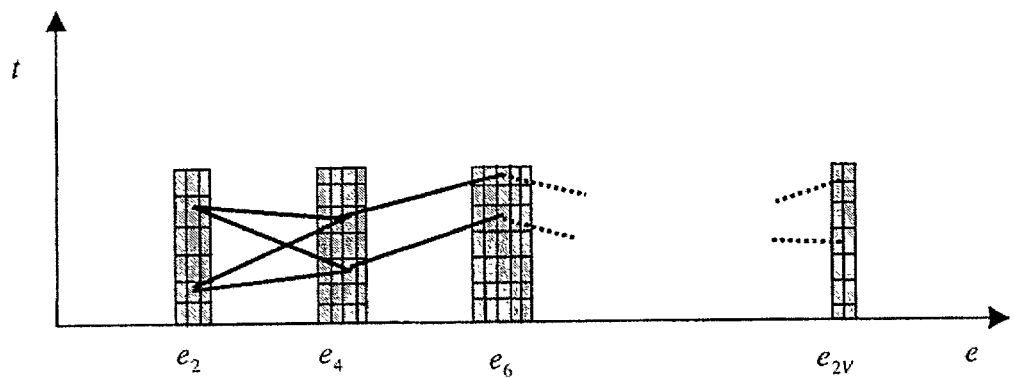
FIG. 5 is a diagram showing endplate detection as a path finding problem.

Referring to FIG. 5, this procedure will be called forward propagation in the sequel. The solution for endplate positions is obtained by back-tracing from the maximum of the last layer. FIG. 5 graphically depicts how this recursive score computation procedure can be viewed as an optimal path-finding problem, optimal in the sense of maximum score.

Figure 6:
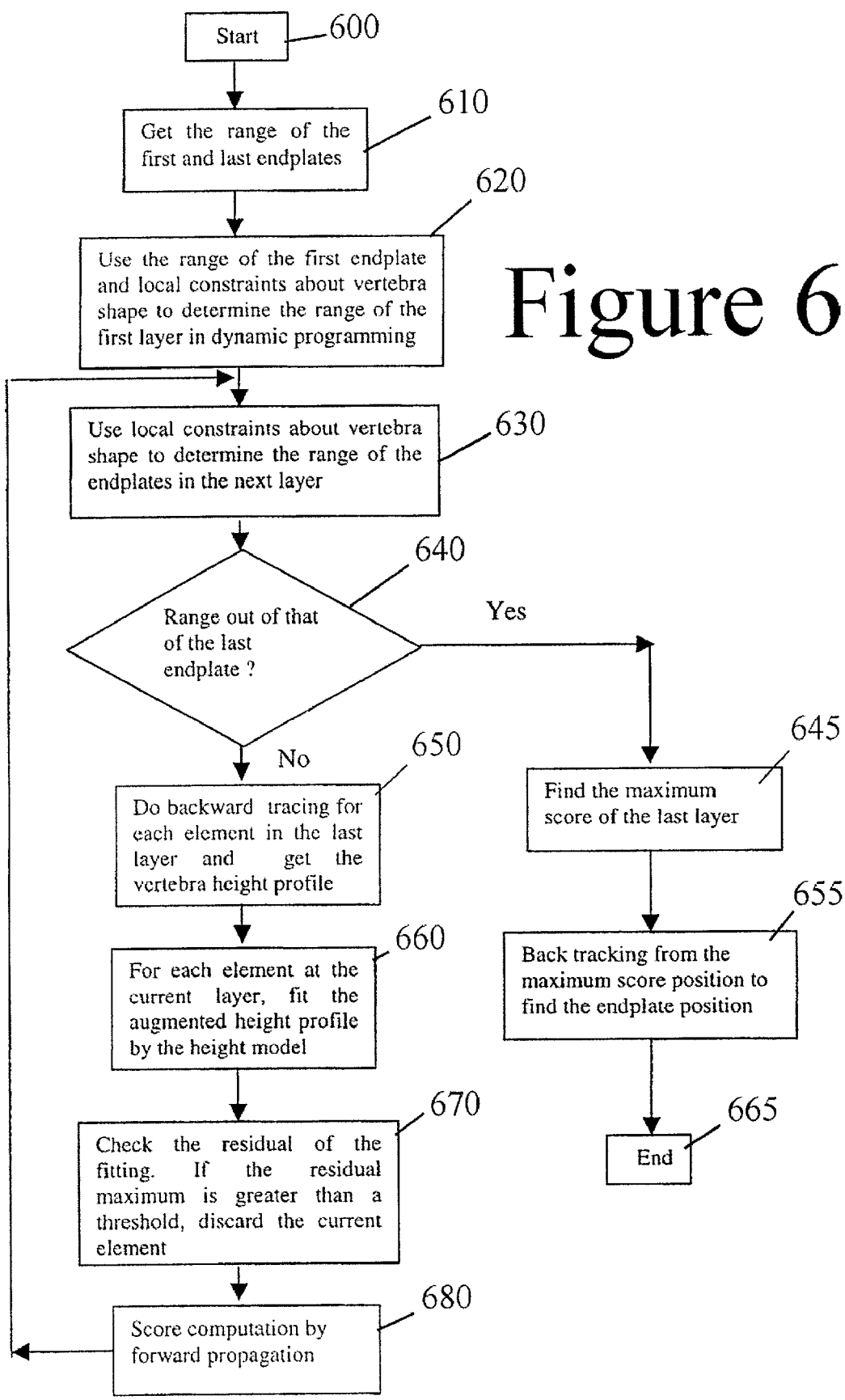
FIG. 6 is a flowchart of a method of dynamic programming.

Referring to FIG. 6, in the presence of the constraints of Equations (1)~(5), we modify the forward propagation as follows. First, local constraints of Equations (1)~(4) are used to define the parameter ranges over which the maximizations are made. Here it is assumed that the ranges of the first and the last endplates $e_1$ and $e_N$ are known a priori at control box 610. Denote these ranges by $[e_{1,min}, e_{1,max}]$ and $[e_{N,min}, e_{N,max}]$, respectively. (Note that the total number of endplates, N, is unknown.). From the height constraint (1), the range of $e_2$ can be obtained as $[e_{2,min}, e_{2,max}] = [e_{1,min}+h_{min}, e_{1,max}+h_{max}]$. For each $e_2 \in [e_{2,min}, e_{2,max}]$, and each $e_1 \in [e_{1,min}, e_{1,max}]$, the corresponding vertebra height is $h_1 = e_2 - e_1$. Based on Equation (3), the range $[t_{1,min}, t_{1,max}]$ for $t_1$ can be computed at control box 620. At control box 630, the propagation from the range $[e_{v,min}, e_{v,max}] \times [t_{v,min}, t_{v,max}]$ at layer $L_v$ to the layer $L_{v+1}$ is obtained similarly.

At control box 650, for the global constraint of Equation (6), local backward tracing is introduced during the forward propagation. For the maximization at layer $L_v$, back-tracing is done for each element $p_{v-1} \in [e_{2(v-1),min}, e_{2(v-1),max}] \times [t_{v-1,min}, t_{v-1,max}]$ at layer $L_{v-1}$. This identifies a locally optimal path for each $p_{v-1}$. From the local path of $p_{v-1}$, a profile of vertebra heights $H_{P_{v-1}} = \{h_{P_{v-1}}(i), i=1, 2, \ldots, v-1\}$ can be obtained. Then, at box 660, for each element $p_v = (e_{2v}, t_v)$ at layer $L_v$, we check whether the augmented height profile $H_{P_v} = \{H_{P_{v-1}}, h_{P_v}(v)\}$, with $h_{P_v}(v) = e_{2v} - (e_{2(v-1)} + t_{v-1})$, satisfies the global model of Equation (6). To do this, an iterative, alternating estimation procedure is adopted to estimate the parameters k, a, b first, based on the given profile. Initially, the parameter a is set as $a^{(0)}=1$, where the super script represents the iteration number. Then, Equation (6) becomes linear in k and b, and can be solved for $k^{(1)}$, $b^{(1)}$. Inserting the obtained $k^{(1)}$, $b^{(1)}$ into Equation (6), Equation (6) can be solved for a to get a $a^{(1)}$. With the obtained $a^{(1)}$, new values $k^{(2)}$ and $b^{(2)}$ are solved for. This procedure repeats until convergence is reached. With the obtained fitting parameter, the residual error for each height is checked at box 670. A height profile h(i), i=1, ..., K is said to satisfy the global model if ∀i $$|h(i) - ka^i - b|/h(i) < \delta_h \quad (17)$$

where $\delta_h$ is a predefined value. If the height profile satisfies the global model, element $p_v$ is kept. Otherwise, it is discarded. All elements that remain at layer $L_v$ satisfy a global model and are then used at box 680 in the forward score propagation at the next layer. In this way, the global constraint is ensured in a progressive way.

When the last endplate is scored, control branches at box 640 to box 645 where the maximum score is found for the last layer. At box 655, we backtrack from the position of this maximum score to find the endplate. No further operation is performed on the height profile, because it has already satisfied the model.

Figure 7:
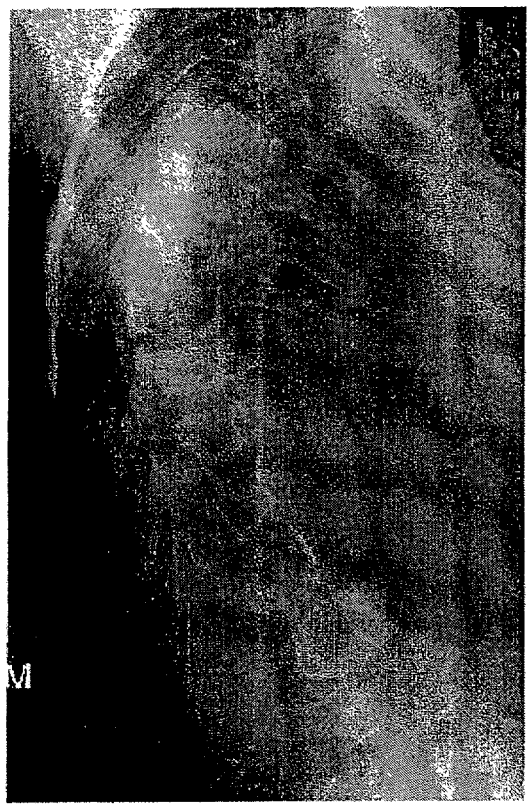
FIG. 7 shows a spinal image before and after endplate detection.
Figure 7:

FIG. 7 shows an example of endplate detection using the disclosed technique in this invention.

The detected endplates can be used to compute the wedge angle and tilt angel of any vertebra as well as the Cobb angle. All these angles are important measurements in the deformity analysis of spines, upon which physicians rely to make decision about diagnosis or surgical planning.

The methods of the invention may be implemented as a program of instructions, readable and executable by machine such as a computer, and tangibly embodied and stored upon a machine-readable medium such as a computer memory device. An embodiment may be in the form of a computer controlled module into which is input a spinal image such as FIG. 7(a) and returns the image superimposed with the endplate positions, such as FIG. 7(b).

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for detecting endplates of vertebra, comprising the steps of:
   providing a filtered curvature map derived from filtering an intensity curvature map of a spine image in a direction relative to a spine axis;
   computing minimum and maximum curvature projections for each point along said spine axis;
   at a plurality of points on said spine axis, computing a score E from said curvature projections, said score indicating the likelihood that the point is located on an endplate, wherein said score E is computed from the equation $$E = \sum_{i=1}^{N} C_{s,max}(e_i) + \sum_{V=1}^{V} \max_{p \in (e_{2v}, e_{2(v+1)})} \{C_{s,min}(p)\}$$

where V is the number of vertebrae, the first term is the sum of the values of said maximum curvature projections at endplate positions, and the second term is the sum of the values of said minimum curvature projections at intervertebral disc positions; and subjecting said score calculation to at least one of the following constraints:
(1) that the angle between neighboring endplates not exceed a certain value; and
(2) that the variation in height of vertebra of said spine image should satisfy a global model.

2. The method of claim 1 wherein said step of computing minimum and maximum curvature projections further comprises the steps of:
computing said spine axis from a spine image boundary;
at each point p along said spinal axis, compute a curve set $S_p$ of all fitting curves passing through point p from one boundary to the other that fit the parabolic equation $y=kx^2+b$;
deriving said maximum curvature projection as the maximum of the curvature sums along said fitting curves; and
deriving said minimum curvature as the minimum of the curvature sums along said fitting curves.

3. The method of claim 1 wherein said score is computed by dynamic programming.

4. The method of claim 3 wherein said dynamic programming comprises the steps of:
obtaining the range of first and last endplates;
using the range of said first endplate and said constraints to determine the range of the next endplate if still within range of said last endplate;
backward tracing through the state space in the dynamic programming optimization of the score to derive a vertebra height profile;
fitting a global endplate height model to an augmented height profile up to a threshold value of the fitting residual;
repeating said step of using said constraints to determine the range of endplates on subsequent endplates until the range of the last endplate is reached.

5. A program storage device, readable by machine, tangibly embodying a program of instructions executable by the machine to perform method steps for detecting endplates of vertebra, said method steps comprising:
providing a filtered curvature map derived from filtering an intensity curvature map of a spine image in a direction relative to a spine axis;
computing minimum and maximum curvature projections for each point along said spine axis;
at a plurality of points on said spine axis, computing a E score from said curvature projections, said score indicating the likelihood that the point is located on an endplate, wherein said score E is computed from the equation $$E = \sum_{i=1}^{N} C_{s,\max}(e_i) + \sum_{V=1}^{V} \max_{p \in (e_{2v}, e_{2(v+1)})} \{C_{s,\min}(p)\}$$

where V is the number of vertebrae, the first term is the sum of the values of said maximum curvature projections at endplate positions, and the second term is the sum of the values of said minimum curvature projections at intervertebral disc positions; and
subjecting said score calculation to at least one of the following constraints:
d) that the angle between neighboring endplates not exceed a certain value; and
e) that the variation in height of vertebra of said spine image should satisfy a global model.

6. The invention of claim 5 wherein said step of computing minimum and maximum curvature projections further comprises the steps of:
computing said spine axis from a spine image boundary;
at each point p along said spinal axis, compute a curve set $S_p$ of all fitting curves passing through point p from one boundary to the other that fit the parabolic equation $y=kx^2+b$;
deriving said maximum curvature projection as the maximum of the curvature sums along said fitting curves; and
deriving said minimum curvature as the minimum of the curvature sums along said fitting curves.

7. The invention of claim 5 wherein said score is computed by dynamic programming.

8. The invention of claim 7 wherein said dynamic programming comprises the steps of:
obtaining the range of first and last endplates;
using the range of said first endplate and said constraints to determine the range of the next endplate if still within range of said last endplate;
backward tracing through the state space in the dynamic programming optimization of the score to derive a vertebra height profile;
fitting a global endplate height model to an augmented height profile up to a threshold value of the fitting residual;
repeating said step of using said constraints to determine the range of endplates on subsequent endplates until the range of the last endplate is reached.

* * * * *